US006118130A

United States Patent [19]
Barry

[11] Patent Number: 6,118,130
[45] Date of Patent: Sep. 12, 2000

[54] EXTENDABLE FOCAL LENGTH LAMP

[75] Inventor: Jonathan D. Barry, Frederick, Md.

[73] Assignee: Fusion UV Systems, Inc., Gaithersburg, Md.

[21] Appl. No.: 09/193,875

[22] Filed: Nov. 18, 1998

[51] Int. Cl.[7] .................... G02B 5/10

[52] U.S. Cl. .................... 250/504 R; 250/493.1

[58] Field of Search .................... 250/493.1, 504 R, 250/492.1

[56] References Cited

U.S. PATENT DOCUMENTS

| | | | |
|---|---|---|---|
| Re. 32,626 | 3/1988 | Yoshizawa et al. . | |
| 3,443,086 | 5/1969 | Rikis . | |
| 3,796,886 | 3/1974 | Freeman . | |
| 4,042,850 | 8/1977 | Ury et al. . | |
| 4,048,490 | 9/1977 | Troue | 250/504 R |
| 4,149,086 | 4/1979 | Nath . | |
| 4,309,616 | 1/1982 | Wolff . | |
| 4,839,522 | 6/1989 | Bourgeois et al. | 250/455.1 |
| 4,849,640 | 7/1989 | Kruishoop . | |
| 4,863,253 | 9/1989 | Shafer et al. . | |
| 4,973,850 | 11/1990 | Tanaka et al. . | |
| 4,990,789 | 2/1991 | Uesaki | 250/504 R |
| 5,094,010 | 3/1992 | Jacobi et al. | 250/504 R |
| 5,307,210 | 4/1994 | MacFarlane et al. . | |
| 5,361,274 | 11/1994 | Simpson et al. . | |
| 5,504,391 | 4/1996 | Turner et al. . | |
| 5,866,990 | 2/1999 | Ury et al. . | |
| 5,962,860 | 10/1999 | Trokhan et al. | 250/504 R |
| 5,973,331 | 10/1999 | Stevens et al. | 250/504 R |

*Primary Examiner*—Kiet T. Nguyen
*Attorney, Agent, or Firm*—Shlesinger, Arkwright & Garvey LLP

[57] ABSTRACT

An apparatus for treating material with radiant energy, comprises a first reflector having a first object focus disposed outside thereof; and a second reflector having a second object focus. The first reflector is disposed with respect to the second reflector such that the second object focus is disposed further away from the first reflector than the first object focus. A radiant energy source is disposed within the first reflector whereby radiant energy is directed to the first object focus. An auxiliary reflector is disposed at the first object focus whereby radiant energy from the source is reflected to the second reflector and thence to the second object focus where the material being treated is disposed, whereby the second object focus permits the product to be positioned farther than the first object focus.

26 Claims, 3 Drawing Sheets

EXTENDABLE FOCAL LENGTH LAMP

FIELD OF THE INVENTION

The present invention relates generally to an apparatus for curing products and in particular to a microwave-powered lamp for generating ultraviolet radiation for curing UV curable products wherein the lamp focus may be adjusted without reconfiguring its microwave cavity.

BACKGROUND OF THE INVENTION

In a microwave-powered lamp, the optical reflector is designed to focus the radiation at a desired point and provide a microwave cavity for efficient coupling of the microwave energy with the bulb. The lamp design is necessarily a compromise between the desired optical characteristics and the required microwave cavity, since designing for certain optical characteristics will also affect the characteristics of the resulting microwave cavity. It is not an easy task to design a reflector that will have both good optical and microwave cavity characteristics. Thus, once a design compromise is reached, it is common to fit the application to the lamp, rather than designing a different lamp for each application. Consequently, prior art lamps have fixed focal points.

If an application requires a different focal point, prior art lamps with fixed focal points are used in a way that may not be most efficient, since the product being cured may not be receiving the optimum energy from the lamp due to mismatch of the lamp's optical characteristics with the actual location of the product in the curing chamber.

There is, therefore, a need for a lamp whose focal point may be adjusted as desired for a specific application without disturbing its basic optical and microwave cavity characteristics.

OBJECTS AND SUMMARY OF THE INVENTION

It is an object of the present invention to provide a microwave-powered lamp for UV curing wherein the focus of the lamp may be changed without re-designing the microwave cavity of the lamp.

It is another object of the present invention to provide a lamp for curing wherein infrared radiation is absorbed by a coolant, such as a liquid or gas, to thereby prevent unnecessary heating of the product being cured.

It is still another object of the present invention to provide a lamp for curing wherein the cooling air for cooling the bulb is isolated by a distance from the product being cured to thereby minimize contamination of the cooling air from the gaseous products of the curing process.

It is another object of the present invention to provide a lamp for curing wherein the energy level available at the lamp focus may be changed to suit a particular process.

In summary, the present invention provides an apparatus for treating material with radiant energy, comprising a first reflector having a first object focus disposed outside thereof; and a second reflector having a second object focus. The first reflector is disposed within the second reflector such that the second object focus is disposed further away from the first reflector than the first object focus. A radiant energy source is disposed within the first reflector whereby radiant energy is directed to the first object focus. An auxiliary reflector is disposed at the first object focus whereby radiant energy from the source is reflected to the second reflector and thence to the second object focus where the material being treated is disposed, whereby the second object focus permits the product to be positioned farther than the first object focus.

These and other objects of the present invention will become apparent from the following detailed description.

BRIEF DESCRIPTIONS OF THE DRAWINGS

Figure 1:
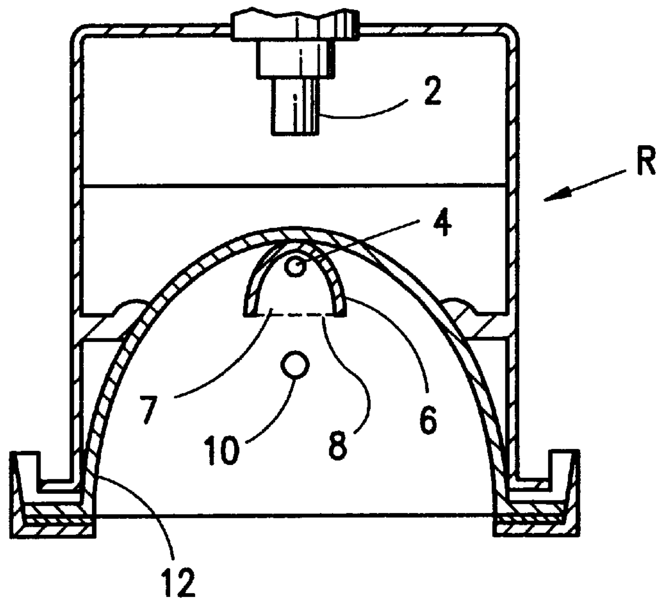
FIG. 1 is cross-sectional view of a lamp made in accordance with the present invention.
Figures 4A, 4B, 4C:
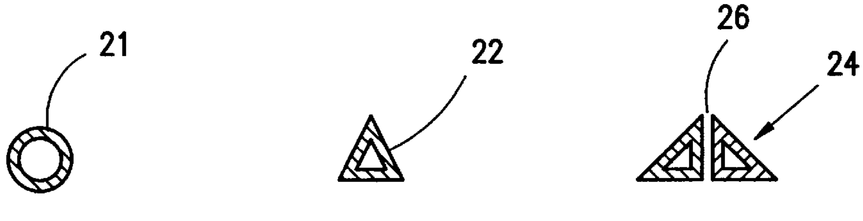

FIGS. 4(A), 4(B) and 4(C) are cross-sectional views of several embodiments of an auxiliary reflector used in the lamp of FIG. 1.

Figure 5:
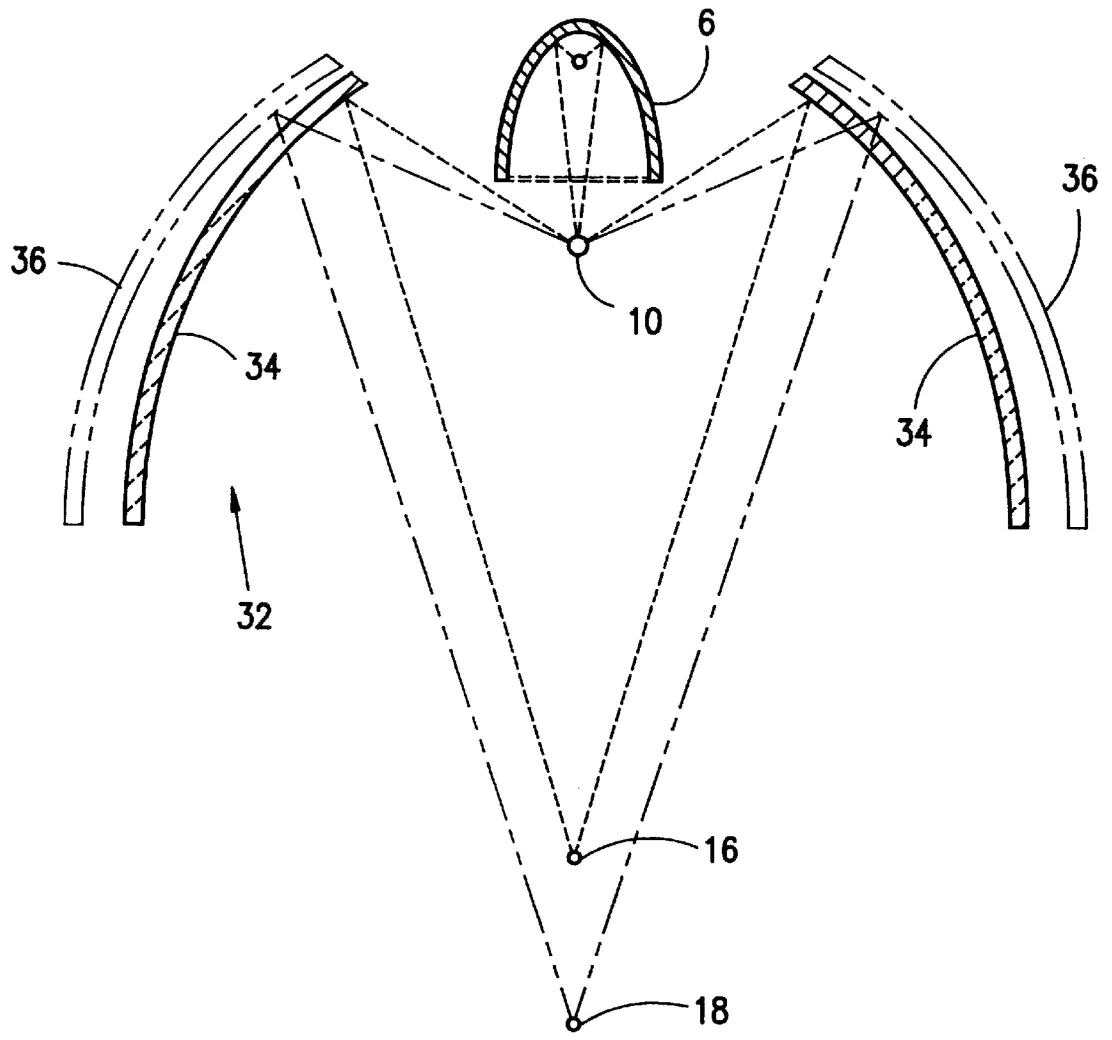

FIG. 5 is a schematic enlarged view of another embodiment of the reflector system shown in FIG. 1.

DETAILED DESCRIPTION OF THE INVENTION

A lamp R made in accordance with the present invention is disclosed in FIG. 1. The lamp R is powered by a microwave source 2 which is coupled to a bulb 4 disposed within a reflector 6 that defines a microwave cavity 7. The bulb 4 is a plasma discharge bulb generating radiation, such as ultraviolet or infrared, for curing. A mesh screen 8 keeps the microwave energy confined within the microwave cavity 7. The screen 8 is transparent to the radiation from the bulb 4. Examples of microwave-powered lamps are disclosed in U.S. Pat. Nos. 5,504,391 and 4,042,850. Although a microwave power source is disclosed, the bulb 4 may also be driven by any other power sources, such as an arc.

The reflector 6 may be an elliptical cylinder for line focusing, with the source and object foci being correspondingly longitudinal. The source focus is disposed within the reflector while the object focus is outside. The bulb 4, which may be longitudinal, is disposed at the source focus. The reflector 6 may also be elliptical spherical for point/beam focusing, with the bulb 4 being spherical.

An auxiliary reflector 10 is disposed at the object focus of the reflector 6.

An outer reflector 12 is disposed outside the reflector 6 and the auxiliary reflector 10, as been shown in FIG. 1. The reflector 12 may be an elliptical cylinder with correspondingly longitudinal source focus coinciding with the object focus of the reflector 6 and an object focus disposed outside the reflector 12. The auxiliary reflector 10 is also disposed along the source focus of the reflector 12. Other shapes for the reflector 12 are possible.

By replacing the reflector 12 with a different shape, its object focus may be advantageously disposed nearer or farther away from the lamp R, as may be needed for a particular application or process. It is envisioned to have a family of reflectors of different focal lengths for the reflector 12 from which to choose when designing the lamp R to a specific application. In addition to being able to extend the focal length of the lamp R, the energy profile of the object focus of the lamp also be changed, for example, to provide a concentrated or distributed focus by changing the configuration of the auxiliary of the reflector 10, as will be discussed below. The ability to use a different reflector 12 or a different auxiliary reflector 10 advantageously provides a user greater flexibility in designing the lamp R to its specific process. The focal characteristics of the lamp R may thus be changed without reconfiguring the optical and microwave characteristics of the reflector 6.

It should be understood that the terms "object focus" or "source focus", in addition to referring to the foci of an ellipse, also mean in the context of a generalized reflector the position of the light source (object focus) and the location where the light rays are focused (object focus), without regard to the actual geometry of the reflector.

The reflector 6 is configured to be as compact as possible to concentrate as much of the energy radiating from the bulb 4 onto the auxiliary reflector 8. The reflector 6 is made physically small by maximizing the ratio of its major axis to the minor axis. By making the reflector as compact as possible, the bulb is caused to be disposed closer to the top portion of the reflector 6 where cooling air is provided for cooling the bulb 4. The bulb 4 is thereby placed in as short a distance as possible to the cooling source, providing more efficient cooling of the bulb.

The lamp R of the present invention may be used for curing optical fibers, where the fiber is fed through the auxiliary reflector 10. In this application, the auxiliary reflector 10 would be a clear quartz tube or one coated to reflect infrared radiation and transmit UV radiation. Since the reflector 6 is made compact, it will have a much higher intensity focus, which is needed in the optical fiber curing. In another application, called web-type curing, the product to be cured is carried by a web or belt inside a chamber where oxygen may be excluded. The reflector 12 would be configured such that its object focus would be such that sufficient space between the bottom of the lamp R and the focus would be provided to accommodate some mechanical structures used in providing an inert atmosphere. In another application involving three-dimensional curing, the auxiliary reflector 10 would be configured such that a three-dimensional focus point would be generated rather than a very narrow sharp focused light. In this application, the energy profile at the focus would be distributed with depth, such as a concentrated beam, to cover the depth of the product being cured. Examples of three-dimensional curing include automobile headlamps, wheel covers, medical parts, etc.

The present invention provides flexibility for a customer to modify with relative ease a lamp with fixed focus to one where the focus can be directed where it is needed. Without disturbing the basic microwave properties of the inner reflector 6, the lamp R is able to accommodate several applications requiring different optical characteristics—short focus, intermediate focus or long focus.

In operation, radiation 14 from the bulb 4 is focused by the reflector 6 onto the auxiliary reflector 10 which is then reflected off the outer reflector 12 to a focal point 16, where a product being cured would be located. For a different application where the focal point 16 needs to be moved out, for example to a focal point 18, a different reflector 20 is substituted for the reflector 12. The reflector 20 may be elliptical and is chosen such that its focus will be disposed at focal point 18.

The amount of energy concentrated at focal point 16 or 18 may be modified by changing the cross sectional shape of the auxiliary reflector 10. With the proper choice for the auxiliary reflector 10, the energy at the focal point 16 or 18 can be configured to a given energy profile, such as one with a high peak, a distributed focus, or one with different peak intensities on different locations on the substrate or product. A circular auxiliary reflector 21 would generate a concentrated focus. A triangular auxiliary reflector 22 would provide a distributed focus and would tend to reflect more light out towards the outer reflector 12, since it is preferable to minimize the amount of light that is reflected back into the reflector 6 were the energy is wasted. With a split triangle 24, with an opening 26 between the two triangles, part of the radiation from the bulb 4 would pass through the opening 26 and impinge directly on the product while the rest of the radiation will be reflected off the sides of the two triangles, providing yet another light intensity pattern on the product. Other shapes of the auxiliary reflector 10 may be used, depending on the required energy profile at the focus for curing the product.

The surface of the auxiliary reflector 10 may be coated so that UV radiation is reflected and infrared radiation is transmitted into the interior of the auxiliary reflector, if an application only requires UV radiation. Cooling fluid is then circulated through the inside of the reflector, thereby absorbing the infrared radiation that would otherwise heat up the curing environment where heat may not be required for the curing chemistry.

Figure 3:
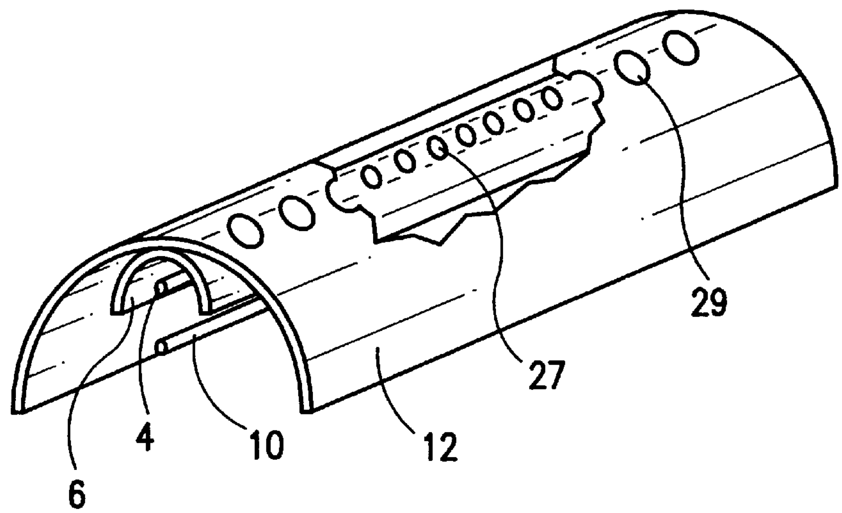
FIG. 3 is schematic perspective view of the reflectors used in the lamp of FIG. 1.

The present invention also provides for better cooling of the bulb 4. With the reflector 6 as compact as possible, the bulb 4 is necessary placed physically close to the crown region of the reflector 6, where holes 27 are disposed for passing cooling air to the bulb 4, as best shown in FIG. 3. With the bulb 4 being in close proximity to the cooling source, cooling the bulb becomes more efficient than if the bulb is further away from the cooling source. The bulb 4 is placed in a direct line to the cooling source with a much shorter distance than the prior art lamp, minimizing any opportunity for the cooling jets to disperse before hitting the bulb.

Figure 2:
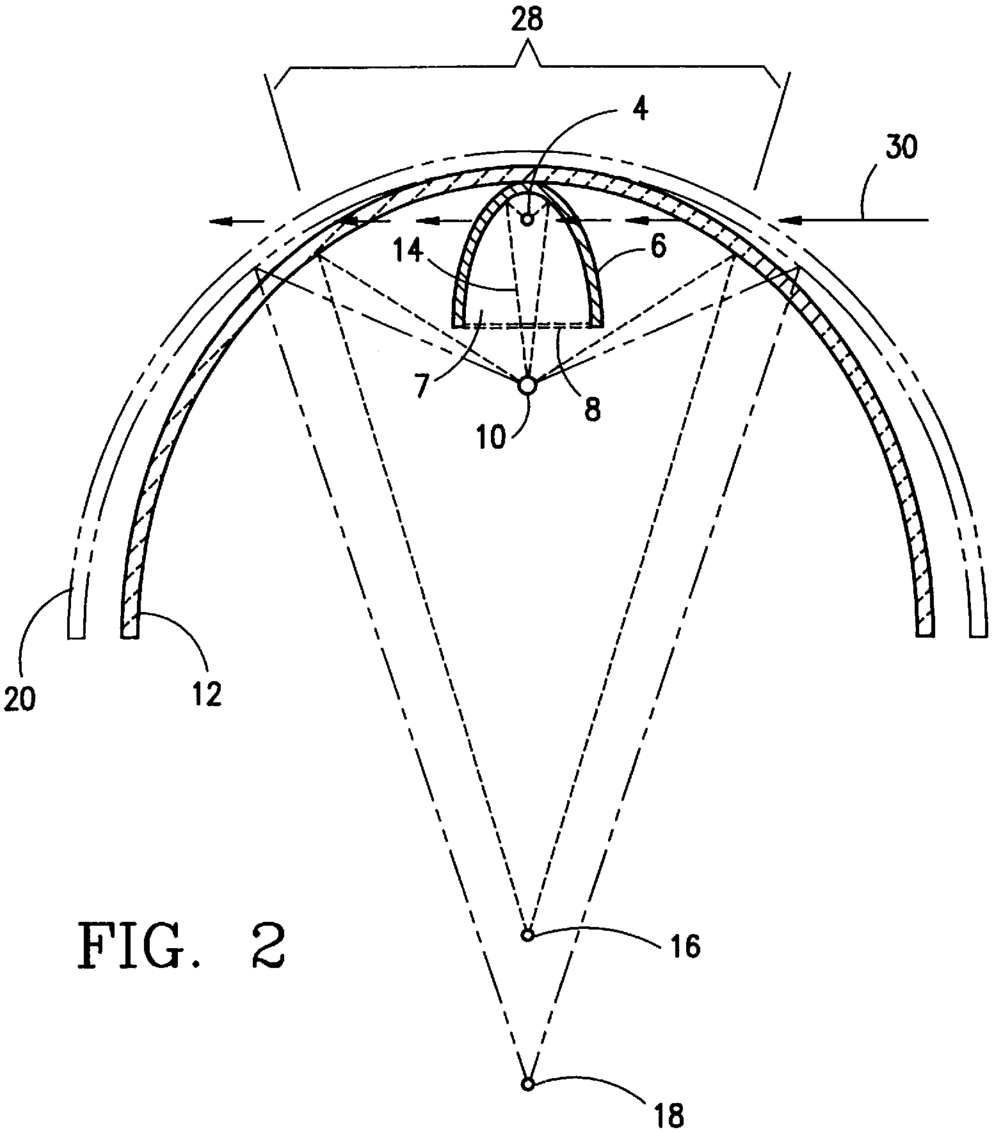
FIG. 2 is a schematic enlarged view of the reflector system used in the lamp of FIG. 1.

The reflector 12 has a region 28 which is substantially optically dark, since it receives very little reflected radiation from the auxiliary reflector 10, as best shown in FIG. 2. Holes 29, air jets or other cooling means may be provided in the region 28 to provide a direct airflow 30 toward the bulb 4 to cool it. Since the airflow 30 is substantially parallel to the product, which is disposed at the focus 16 or 18, intermingling of the airflow with the gaseous products of the curing process would be minimized. This advantageously simplifies the handling of the exhaust cooling air, minimizing the need for air filters, etc. If desired, the volume defined by the region 28 and the lines subtending from the auxiliary reflector 10 and the lower edge of the reflector 6 may be sealed from the curing environment, thereby further isolating the cooling air from the volatile products of the curing process. Appropriate holes 27 are provided on both sides near the crown of the reflector 6 to allow direct path for the cooling airflow 30 to the bulb 4. The opening of the reflector 6 may also be enclosed with a clear quartz window for increased isolation of the cooling air from the curing process.

The region 28 of the reflector 12 may be eliminated, since it does not provide an optical function. In this embodiment, a reflector 32 includes two component reflectors 34, one on each side of the reflector 6, to catch the radiation reflecting from the auxiliary reflector 10 and direct the radiation to the focus 16, as best shown in FIG. 5. Although the reflectors 34 are shown with the same curvature as that of the single reflector 12, each reflector 34 may be formed of different curvatures from each other to provide additional flexibility in modulating the energy profile at the focus 16. Alternative reflectors 36 with the longer focus 18 are shown.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. An apparatus for treating material with radiant energy, comprising:

a) a first elliptical reflector having a first object focus disposed outside thereof;

b) a second elliptical reflector having a second object focus, said first elliptical reflector being disposed with respect to said second elliptical reflector such that said second object focus is disposed farther away from said first elliptical reflector than said first object focus;

c) a radiant energy source disposed within said first reflector whereby radiant energy is directed to said first object focus; and d) an auxiliary reflector disposed at said first object focus whereby radiant energy from said source is reflected to said second elliptical reflector and directed to said second object focus where the material being treated is disposed, whereby said second object focus permits the material to be positioned farther than said first object focus.

2. An apparatus as in claim 1, wherein:

a) said second elliptical reflector comprises first and second component reflectors.

3. An apparatus as in claim 2, wherein:

a) said first and second component reflectors have the same curvature.

4. An apparatus as in claim 1, wherein:

a) said first elliptical reflector includes a first source focus; and b) said radiant energy source is disposed at said first source focus.

5. An apparatus as in claim 1, wherein:

a) said radiant energy source is microwave-powered.

6. An apparatus as in claim 1, wherein:

a) said auxiliary reflector is tubular.

7. An apparatus as in claim 1, wherein:

a) said auxiliary reflector is tubular;

b) said auxiliary reflector is UV reflective and IR transmissive; and c) said auxiliary reflector includes a coolant for absorbing IR energy transmitted therethrough.

8. An apparatus as in claim 1, wherein:

a) said auxiliary reflector has a circular cross-section.

9. An apparatus as in claim 1, wherein:

a) said auxiliary reflector has a polygonal cross-section.

10. An apparatus as in claim 9, wherein:

a) said polygonal cross-section is a triangle.

11. An apparatus as in claim 1, wherein:

a) said auxiliary reflector comprises a pair of reflectors, each being triangular in cross-section;

b) said pair of reflectors includes a space between them through which radiation from said source can pass through.

12. An apparatus as in claim 1, wherein:

a) said first reflector includes first and second sets of holes disposed near a top portion of said first reflector; and b) said radiation source is a bulb disposed between said first and second sets of holes.

13. An apparatus as in claim 1, wherein:

a) said first elliptical reflector includes minor and major axes; and b) the ratio of said major axis to said minor axis is maximized to obtain a compact reflector.

14. An apparatus for treating material with radiant energy, comprising:

a) a first elliptical reflector having first source and object foci;

b) a second elliptical reflector having second source and object foci, said first reflector being disposed within said second reflector such that said first object focus coincides with said second source focus, said second object focus being disposed farther away from said first reflector than said first object focus;

c) a radiant energy source disposed at said first source focus whereby radiant energy is directed to said first object focus;

d) an auxiliary reflector disposed at said first object focus whereby radiant energy from said source is reflected to said second reflector and directed to said second object focus where the material being treated is disposed, whereby said second object focus permits the material to be positioned farther than said first object focus.

15. An apparatus as in claim 14, wherein:

a) said auxiliary reflector is tubular.

16. An apparatus as in claim 14, wherein:

a) said auxiliary reflector is tubular;

b) said auxiliary reflector is UV reflective and IR transmissive; and c) said auxiliary reflector includes cooling fluid for absorbing IR energy transmitted therethrough.

17. An apparatus as in claim 14, wherein:

a) said first reflector includes first and second sets of holes disposed near a top portion of said first reflector; and b) said radiation source is a bulb disposed between said first and second sets of holes.

18. An apparatus as in claim 14, wherein:

a) said radiation source is microwave-powered.

19. An apparatus as in claim 14, wherein:

a) said radiation source is ultraviolet radiation.

20. An apparatus as in claim 14, wherein:

a) said first and second reflectors are longitudinal.

21. An apparatus as in claim 20, wherein:

a) said bulb is longitudinal.

22. An apparatus for treating material with radiant energy, comprising:

a) radiant energy source;

b) a first means for reflecting radiant energy of said radiant energy source to a first focus disposed outside thereof;

c) a second means for reflecting radiant energy of said radiant energy source to a second focus disposed farther away from said first reflecting means than said first focus; and d) a third means for reflecting radiant energy of said radiant energy source, said third reflecting means being disposed at said first focus whereby radiant energy from said source is reflected to said second reflecting means and directed to said second focus where the material being treated is disposed, whereby said second focus permits the material to be positioned farther than said first focus.

23. A method for extending the focal length of a lamp wherein the lamp comprises a first elliptical reflector with a radiant source within and having a first object focus disposed outside the first elliptical reflector, comprising the steps of:

a) providing a second elliptical reflector having a second object focus disposed farther away from the first reflector than the first object focus;

b) positioning an auxiliary reflector at the first object focus;

c) positioning the radiant source with respect to the second reflector such that radiation from the radiant source is reflected from the auxiliary reflector onto the second reflector and directed to the second object focus.

24. A method as in claim 23, and further comprising the step of:

a) absorbing IR radiation at the auxiliary reflector.

25. A method as in claim 23, wherein:

a) the auxiliary reflector is circular in cross-section.

26. A method as in claim 23, wherein:

a) the auxiliary reflector is triangular in cross-section.

* * * * *